Sept. 15, 1931.  E. L. SMALLEY  1,823,067
ELECTRIC HEATER
Filed July 19, 1929   2 Sheets-Sheet 1
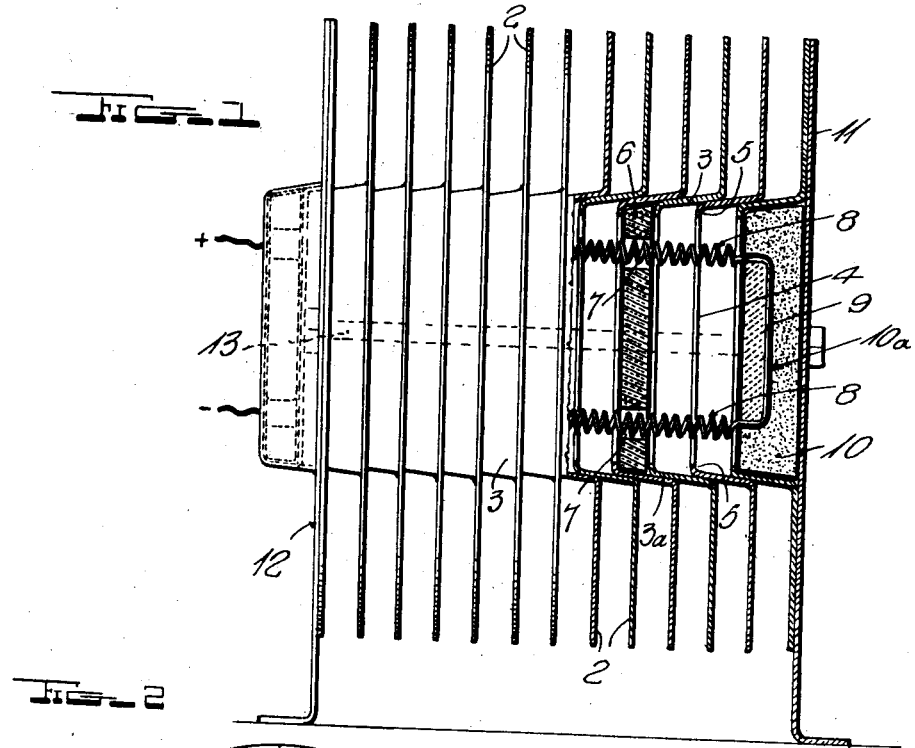
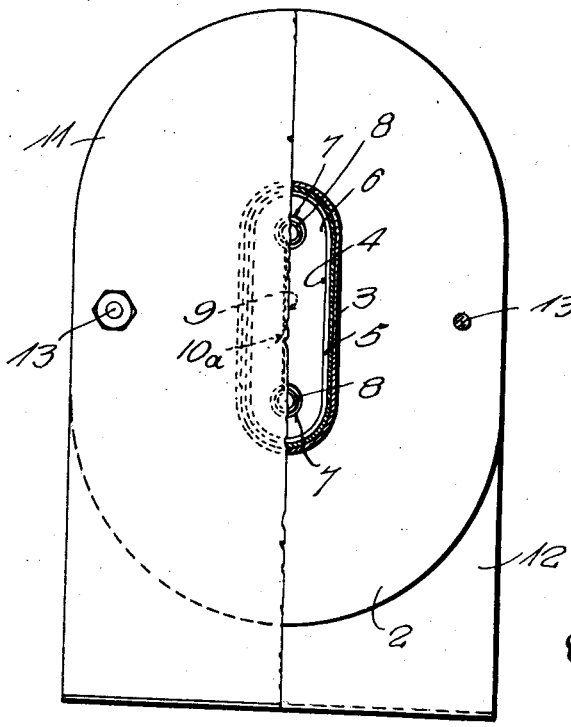
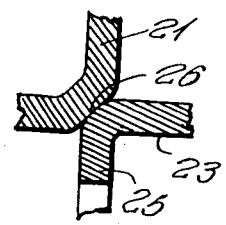
INVENTOR.
Edwin L. Smalley,
BY
John B. Grady
ATTORNEY.

Sept. 15, 1931.  E. L. SMALLEY  1,823,067
ELECTRIC HEATER
Filed July 19, 1929  2 Sheets-Sheet 2
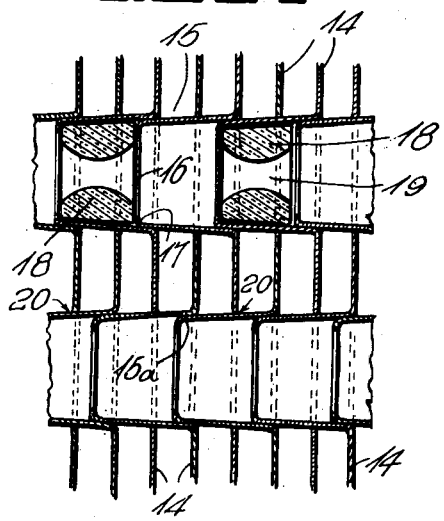
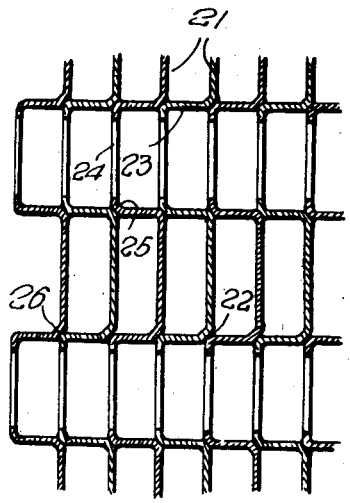
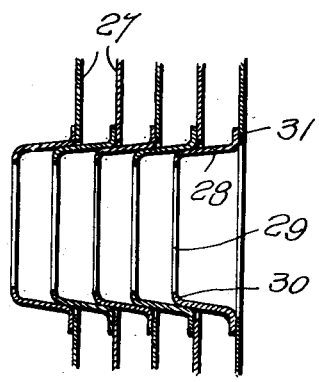
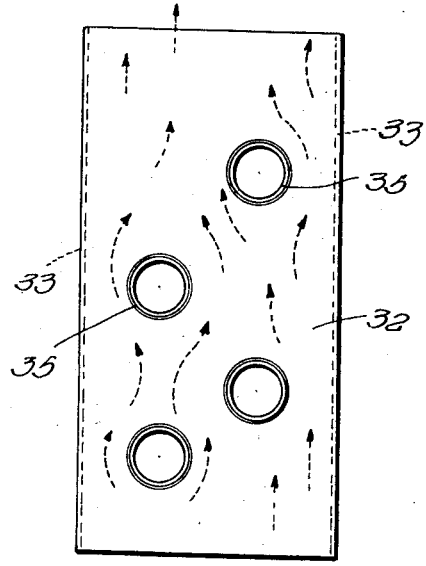
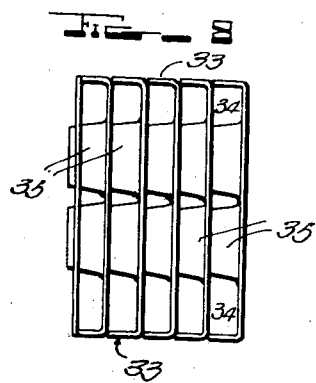
INVENTOR.
Edwin L. Smalley,
BY John B. Brady
ATTORNEY.

Patented Sept. 15, 1931

1,823,067

UNITED STATES PATENT OFFICE

EDWIN L. SMALLEY, OF WHITEFISH BAY, WISCONSIN, ASSIGNOR TO HEVI DUTY ELECTRIC COMPANY, OF MILWAUKEE, WISCONSIN, A CORPORATION OF WISCONSIN

ELECTRIC HEATER

Application filed July 19, 1929. Serial No. 379,546.

My invention relates broadly to electric heaters and more particularly to an electrical heater having means for radiating heat to surrounding atmosphere from a relatively high temperature source.

One of the objects of my invention is to provide an electrical space heater having the elements thereof arranged to release a large quantity of heat in a given space for relatively low operating temperature of the heating elements.

Another object of my invention is to provide an electric heater having an enclosed heating element without electrically exposed parts, the enclosing means serving to conduct and radiate heat to the surrounding atmosphere with a relatively high degree of efficiency.

Still another object of my invention is to provide an electric heater having its parts arranged for simplified production at low cost, the parts being capable of ready assembly inexpensively and in a simplified manner.

A further object of my invention is to provide a construction of electric heater wherein the heating coils are encased and centered within telescopic members each of which have heat conducting and radiating plates integrally connected therewith and assembled one parallel to the other for the dissipation of heat to the surrounding atmosphere.

A still further object of my invention is to provide a construction of electric heater having heating coils supported by insulator members each of which is supported within a cup shaped casing, the cup shaped casings being nested one with respect to the other, and flanges extending therefrom and parallel one with respect to the other for radiating heat from the cup shaped casings.

Other and further objects of my invention reside in the simplified construction of electric heater described in the specification hereinafter following and set forth in the accompanying drawings in which:

Figure 1 is a side elevation of one form of electric heater embodying my invention partially broken away and illustrated in cross-section to show the arrangement of parts within the heater; Fig. 2 is an end elevation of the electric heater, with parts broken away and shown in cross-section; Fig. 3 is a cross-sectional view of a modified construction of electric heater embodying the principles of my invention; Fig. 4 shows a further modified form of electric heater embodying my invention; Fig. 5 is an enlarged cross-sectional view of a fragmentary part of Fig. 4 of the electric heater; Fig. 6 illustrates a further modified form of assembly of the casing elements for the electric heater of my invention; Fig. 7 is an end elevation of a modified form of electric heater embodying the principles of my invention; and Fig. 8 is a top plan view of the construction of electric heater illustrated in Fig. 7.

In the electrical space heater of my invention I provide a plurality of parts of similar characteristics in the form of plate members having depressions therein in the form of cup shaped or dish-like depressions. The plate members are nested one with respect to the other and the depression or offset portion of one plate telescopically arranged with respect to the depression or offset portion of an adjacent plate. Between the offset portions of the selected plates I arrange insulator members each of which are apertured for the passage of resistance elements therethrough, the resistance elements being so centered with respect to the cup shaped portions of the plates that contact between the resistance elements and the plates is prevented.

I may arrange the plate members in a variety of different ways and utilize a multiplicity of offset portions nested one with respect to the other with heating elements centered within the offset portions whereby a cellular construction is built up and heat rapidly dissipated from the heating elements to the parallel extending members.

The construction of electric heater of my invention will be understood in more detail by reference to the drawings, wherein Figs. 1 and 2 show a construction of heater in assembled form having parallel extending metallic vanes in each of which there are offset or dish like depressions 3 positioned on a central axis through the heater with the bottom of such depressions perforated as at 4. Each of the offset portions or dish like depressions terminate in an inwardly extending flange 5 which forms a means for holding electrical refractories 6 in position. The electrical refractories 6 are mounted between selected parts 2 in such positions that the resistor elements may be positively spaced from the metallic parts of the heater. The electrical refractories 6 are apertured at 7 through which the heating coil 8 is supported out of electrical contact with the surrounding metallic parts. The heating means 8, having terminals marked with polarity signs, are composed of a continuous piece of resistance wire, part in helical coil, and having a part 9 forming a jumper between the two portions of helical coils. This jumper is lodged in a groove 10a, formed in a molded insulation 10, such as pressed asbestos. The transverse section of 10 in Fig. 1 is shown dotted, representing a cement covering over jumper 9 in groove 10a.

The dish-like depressions 3 are so formed that adjacent vanes nest together as at 3a. The whole structure may be supported as by head 11 on one end and by head 12 on the opposite end, the latter being perforated for the reception of the depression in the adjacent vane, and all bound together by tie rods 13.

It will be observed that the depressions in the vanes are directly exposed to the radiation from the heating coil. I thus obtain the value of conduction through solid metal directly to the radiating surfaces on each face of the vanes. The resulting structure or vanes in the electrical heater is such that the vanes release 60 per cent more heat, measured by the wattage released, than can be obtained in the ordinary construction of tube heater. The spaces formed by the vanes render the structure susceptible to the cooling effects of air currents. The perimeters of the vanes and the relatively close proximity of one vane to the other present in effect a guard against any inflammable material getting in contact with the tube portions of the heater. By maintaining the active heating portion of the apparatus at substantially the center of the heater the possibility of accident by human contact with the heated portion of the apparatus is reduced to a minimum.

In Fig. 3 I have shown a modified form of the assembly of vanes 14, where the cup-like depressions 15 of one vane nest in the cup-like depressions in the second adjacent vane instead of in the adjacent vane. This is sometimes resorted to where it is desirable to form two-tube-like structures surrounded by vanes, in which the center distance from tube to tube is such as to prevent drawing two depressions in the same vane. In this structure, an aperture 20 is provided in each vane so that the cupped depression of the adjacent vane may pass through to attain its nesting position 15a with the second adjacent vane. In this structure, I use a form of refractory shown at 18 having a hole 19 through which a heating coil may be projected. The refractory is held in place by inwardly extending flanges 17 surrounding a perforation 16 in the bottom of the cup depression.

In Fig. 4 I show another modified form of vane 21 having cupped-depressions 23, in which perforated openings 24 are surrounded by inwardly extending flanges 25. These cupped depressions are lodged in contact at 22.

In Fig. 5 I show an enlarged section illustrating the contact surface between the cup depressions and its adjacent vane as at 26, wherein the shoulder of vane 21 is made tangential to the curve of cupped depression 23.

In Fig. 6 I show still another modified form of construction, wherein any shape depression may be separately formed and welded to the vanes. In this figure, vanes are shown at 27, to which at 31 are attached by any suitable method, such as welding or brazing, cup depressions 28, having apertured bottoms 29 surrounded by inwardly extending flanges 30. It will be noted that these separately formed cup depressions have outwardly extending flanges to promote the ease of attachment to vanes, but still giving direct through-metal radiation from heating coil to the vanes.

In Figs. 7 and 8, I show a rectangular shaped vane 32 having cupped depressions 35, similar to those heretofore described. Two edges of the vane are turned in at right angles to the face of the vanes as at 33, thereby forming, when assembled together, a series of flues 34. In such assembly I preferably arrange the spacing of the tube or cup depressions so that progressively with the upward flow of air, indicated by arrows, each tube is surrounded by a greater vane surface for the cooling effect. Thus I obtain a multiplicity of flues in a relatively smaller space, with each such flue having a comparatively large heat extracting surface.

I have found the electric heater of my invention extremely practical in its construction as the several parts thereof are similarly constructed and may be assembled in stacked relation without the exercise of any large degree of skill. When assembled the heater is rugged and substantial in its construction and may be supported from the end plates 11 and 12 on any suitable base, or projected from a wall or suspended from a ceiling for the dissipation of a maximum amount of heat.

While I have described preferred embodiments of my invention, I desire that it be understood that modifications may be made and that no limitations are intended upon my invention other than are imposed by the scope of the appended claims.

What I claim as new and desire to secure by Letters Patent of the United States is as follows:

1. In an electric heater, a multiplicity of plate members comprising flange portions and central offset portions, said offset portions being nested one into another, insulation means disposed between selected ones of said offset portions, and heater coils insulatingly supported in said insulation means out of contact with the metallic portions of said heater.

2. In an electric heater, a multiplicity of metallic plates, each of said plates having an offset portion, means securing said plates in parallel relationship with the offset portions thereof nested one with respect to another, insulation means secured between selected ones of said offset portions, and heating elements positioned in said insulation means out of contact with the interior walls of said offset portions.

3. In an electric heater, a multiplicity of parallel extending plate members, said plate members having offset portions nested one with respect to another, insulation means disposed between selected offset portions of said plates, heating elements insulatingly supported by said insulation means for maintaining said heating elements out of contact with the interior walls of said offset portions, and means extending through all of said plate members for binding said plate members as a unit.

4. In an electric heater, a multiplicity of parallel extending plate members, offset portions on each of said plate members, said offset portions being nested one with respect to the other, heating means passing through said offset portions and insulatingly spaced from the interior walls thereof, and binding means for maintaining said plate members in fixed position with respect to each other.

5. In an electric heater, a multiplicity of parallel extending plate members, offset portions on each of said plate members, said offset portions being nested one with respect to the other, heating means passing through said offset portions and insulatingly spaced from the interior walls thereof, a bracket plate located at each end of said multiplicity of plates, and means passing through said bracket plates and through said multiplicity of plates for binding all of said plates in fixed relation.

6. In an electric heater, a multiplicity of parallel extending plate members, each of said plate members including an annular portion and a central offset portion, said central offset portion being tapered from a relatively large diameter in the plane of said annular portion to a smaller diameter remote from the annular portion and terminating in an inturned edge at the smaller diameter of said offset portion, the smaller diameter of the offset portion on one plate member being nested into the larger diameter of the offset portion of an adjacent plate member, insulation means gripped between the inturned edges of selected ones of said plate members, and heating elements insulatingly supported in said insulation means and maintained out of contact with the interior walls of said offset portion.

7. In an electric heater comprising a multiplicity of parallel extending plate members, said plate members having portions thereof offset out of the normal plane thereof with the offset portions nested one with respect to the other, insulation means disposed within the offset portions, heater elements supported by said insulation means and maintained out of contact with the interior walls of said offset portions, and means for binding said plate members in fixed relation.

8. In an electric heater, a multiplicity of parallel extending plate members, said plate members having offset portions disposed therein with the offset portions in one plate member passing through an apertured portion in an adjacent plate member and nested in the offset portion of the next succeeding plate member, insulation means supported in said offset portions, an electrical heating element supported by said insulation means, and means for binding said plate members in fixed relation.

9. In an electric heater, a multiplicity of plate members disposed parallel one to another, cup-like members connected with each of said plate members, the cup-like members of one of said plate members being nested in the cup-like member of an adjacent plate member, an electrical heating element insulatingly supported within said cup-like members, and means for binding said plates in position whereby said cup-like members provide a housing for said electrical heating element and establish a path for the conduction of heat from said element to said plate members.

10. In an electric heater, a multiplicity of parallel extending plate members, said plate members having a double row of depressions therein, means for binding said plate members in parallel relation with the depressions in one row thereof nested one with respect to the other, and the depressions in the other row thereof correspondingly nested with respect to the other, insulation means supported within selected ones of said depressions, and heating elements extending through said insulation means and positively spaced from the interior walls of said depressions.

11. In an electric heater, a plurality of plate members, depressions formed in each of said plate members and nested one with respect to the other for normally spacing said plate members in predetermined relation, flanges formed on selected edges of said plate members for providing a substantially enclosed flue around the depressions in said plate members, and an electrical heater element passing through the interior of said depressions and spaced from the inner walls thereof for imparting heat to said plate members for dissipation therefrom.

12. In an electric heater, a multiplicity of plate members, depressions formed in said plate members and nested one within another for forming a substantially closed casing through said plate members, an electrical heating element enclosed within said depressions for imparting heat to said plate members, and flanges formed on the edges of said plate members for providing air circulation flues around the enclosure formed by said depressions.

In testimony whereof I affix my signature.

EDWIN L. SMALLEY.